United States Patent [19]

Moore

[11] 3,923,821

[45] Dec. 2, 1975

[54] NOVEL 4,4'-BIPYRIDINIUM SALTS

[75] Inventor: Phylis T. Moore, Morgantown, W. Va.

[73] Assignee: Polaroid Corporation, Cambridge, Mass.

[22] Filed: Sept. 7, 1973

[21] Appl. No.: 395,254

[52] U.S. Cl............... 260/296 D; 260/2 R; 350/312
[51] Int. Cl.².................................. C07D 213/22
[58] Field of Search................. 260/296 D

[56] References Cited
UNITED STATES PATENTS 3,251,839  5/1966  Downes et al................. 260/296 d

OTHER PUBLICATIONS

Wagner & Zook, Synthetic Organic Chemistry, Wiley Publishers, pp. 666–670, (1953).
Van Poucke et al., Bull. Soc. Chim. Belges, Vol. 78, pp. 131 to 134 (1969).
Volke et al., Collect. Czech. Chem. Commun. Vol. 34, pp. 2037 to 2047 (1969).

*Primary Examiner*—John D. Randolph
*Attorney, Agent, or Firm*—Mart C. Matthews; Philip G. Kiely

[57] ABSTRACT

Novel viologen salts useful as monomers and in variable density light-filtering devices are provided which are represented by the formula:

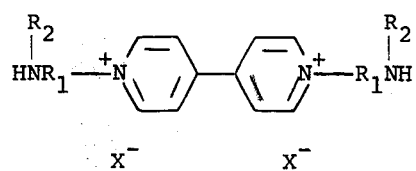

wherein $R_1$ is propylene or a straight-chain alkylene group having 6 to 12 carbon atoms in the chain; $R_2$ is —H or a hydrocarbon group having 1 to 6 carbon atoms; and X is an anion.

8 Claims, No Drawings

NOVEL 4,4'-BIPYRIDINIUM SALTS

BACKGROUND OF THE INVENTION

1. Field of the Invention

This invention relates to novel bipyridinium compounds and, more particularly, to novel 4,4'-bipyridinium salts which exhibit a reversible change in spectral absorption characteristics from their oxidized form to their first reduced form.

2. Description of the Prior Art

Various bipyridinium salts and polymers which undergo reversible oxidation-reduction (redox) changes in spectral absorption characteristics are known and described in the art.

The 4,4'-bipyridinium unit, commonly given the name "viologen," undergoes two separate one electron reduction steps as illustrated in the equation below:

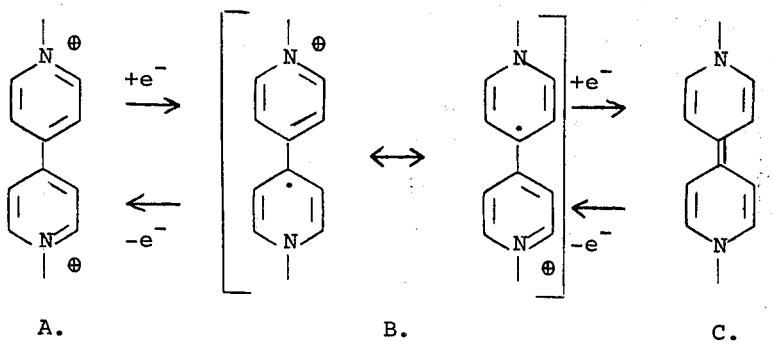

Formula A represents the colorless oxidized dicationic form of the 4,4'-bipyridinium unit which upon the addition of one electron is reduced to a deep blue violet colored delocalized free radical-cation form B. The addition of another electron results in a complete reduction of the radical-cation to a neutral dihydrobipyridyl unit C. Both the B and C forms are rapidly oxidized by oxygen to the starting dicationic unit.

Viologen compounds have been widely used as photochemical or redox indicators in both the chemical and biochemical fields for many years. See, for example, Biochem. Biophys. Acta, 162, page 533 (1968). Polymers containing repeating viologen units, herein referred to as "polyviologens," have been described in the art, and specifically in several recent U.S. Patents, for example, Simon, U.S. Pat. No. 3,641,034; Andrews et al., U.S. Pat. No. 3,671,250; and Factor et al., U.S. Pat. No. 3,694,384.

The polyviologens of the prior art are generally characterized as alkylation polymers, i.e., polymers prepared by polymerizing 4,4'-bipyridyl with a dihalide quaternizing agent, usually a dihaloalkane or a compound having an aromatic nucleus to which at least two haloalkyl substituents are attached. One deficiency of the alkylation polyviologens is their tendency to have low molecular weights and low viscosities, and therefore they do not possess good film-forming characteristics.

It is therefore one object of this invention to provide novel viologen salts.

A further object is to provide novel viologen monomers suitable for interfacial polycondensation.

Still another object is to provide a novel process whereby diamino viologen salts are prepared.

Still other objects of the invention will in part be obvious and will in part appear hereinafter.

SUMMARY OF THE INVENTION

In accordance with this invention, novel viologen salts are provided which may be represented (in oxidized dicationic form) by the formula:

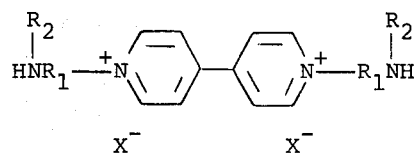

II.

wherein $R_1$ is propylene or a straight-chain alkylene group having 6 to 12 carbon atoms in the chain; $R_2$ is —H or a hydrocarbon group having from 1 to 6 carbon atoms, e.g., alkyl, aryl, cycloalkyl, etc.; and X is an anion, preferably halide, e.g., bromide or chloride.

These water-soluble diquaternary salts are prepared by a novel process wherein both nitrogen atoms of 4,4'-bipyridyl are quaternized by the hydrohalide of an amino halide compound. It will be appreciated, therefore, that the viologen compounds represented by formula II may also exist as the dihydrohalide salt.

The viologen salts of this invention are particularly useful as monomers in interfacial polycondensation reactions providing film-forming polyviologen compounds, and are also useful as redox indicators in a variety of applications.

For a fuller understanding of the nature and objects of this invention, reference should be had to the following detailed description.

DETAILED DESCRIPTION OF THE INVENTION

The preparation of the viologen salts of this invention in general terms involves the quaternization of both of the tertiary amine groups of 4,4'-bipyridyl with two moles of a halide compound having a terminal primary or secondary amine group with which a hydrohalide molecule is associated. The basic reaction, therefore, utilizes a modification of the well-known "Menshutkin reaction" for the preparation of quaternary ammonium compounds.

4,4'-bipyridyl is a well-known commercially available compound and may be prepared by conventional methods.

The amino halide hydrohalide is a compound of the formula:

III.  

wherein $R_1$ and $R_2$ are as defined above for formula II, i.e., $R_1$ is propylene or a straight-chain alkylene group having 6 to 12 carbon atoms in the chain and $R_2$ is —H or a hydrocarbon group having 1 to 6 carbon atoms, e.g., 1 to 6 carbon alkyl, aryl, alkylaryl, cycloalkyl, etc.; and $X_1$ is a halide, e.g., bromide or chloride. Those amine halide hydrohalides having straight-chain alkylene groups with less than three carbon atoms in the chain are not suitable for the preparation of viologen salts in accordance with this invention since the elimination of the halide atom on such compounds results in the formation of a double bond in the carbon chain, rather than a condensation reaction with the 4,4'-bipyridyl.

In addition, amino halide hydrohalides with 4 or 5 carbon atoms in the alkylene chain are also not suitable since they have a tendency to form cyclic products rather than quaternize the bipyridyl nitrogen atoms. Those amino halides having more than about 12 carbon atoms in the alkylene chain or more than about 6 carbon atoms in the hydrocarbon group represented by $R_2$ form viologen salt products which are sparingly soluble in water and may create micelles in aqueous media. As examples of suitable amino halide hydrohalides, mention may be made of 3-bromopropylamine hydrobromide and 3-bromopropyl-(N-n-propyl)amine hydrobromide.

It has been quite unexpectedly discovered that both nitrogen atoms of 4,4'-bipyridyl can be quaternized to form the novel diamino viologen salts of formula II simply by reacting 4,4'-bipyridyl with the hydrohalide salt of a primary or secondary amino halide under reflux conditions without the necessity of "protecting" or "blocking" the amine group. The conventional approach would have been to react the bipyridyl with a derivative of the amino halide in which the amine group was protected as a nonreactive group during quaternization, e.g., as a phthalimido group, which group could be reconverted to the amine after quaternization had been accomplished. Attempts to follow this procedure, however, only resulted in the monoquaternized product with, for example, α-(γ-bromopropyl)-phthalimide.

It is believed, without intending to be bound by this theory, that the successful results herein achieved with the hydrohalide salt of the amino halide are due in large part to the difference in basicity of the bipyridyl nitrogen atoms and those of the amino halide hydrohalide. The hydrohalide molecule tends to mask the amine group of the amino halide sufficiently to make the quaternization reaction the most preferred. The end result of this hydrohalide procedure is a complex mixture of products, but separation of the desired diamino viologen salt is possible in a relatively high yield by repeated reprecipitations with an organic solvent, e.g., ethanol or acetone, from a water solution.

As an illustrative nonlimiting example of the above described preparation, 3-bromopropylamine hydrobromide was reacted with 4,4'-bipyridyl as follows:

EXAMPLE I 49.7 g. (0.227 mole) of 3-bromopropylamine hydrobromide (obtained from Aldrich Chemical Co., No.B7980) was dissolved in 125 ml. of 2B ethanol at 40°–45° C. To this clear amber solution, 16.65 g. (0.113 mole) of 4,4'-bipyridyl was added followed by 100 ml. of ethanol. The solution was heated at reflux under nitrogen for about 45 hours and a yellow solid precipitated which, after collecting on a filter, washing with ethanol and acetone, and drying, was shown by NMR to be a complex mixture of products. After repeated reprecipitations with ethanol from a water solution, the desired viologen salt was obtained in about 40 percent yield. Two elemental analyses were performed on the same sample of the light yellow solid and the results compared with the calculated theoretical values as follows:

|  |  | % of Element in Compound | | | |
|---|---|---|---|---|---|
|  |  | C | H | N | Br |
| Calculated |  | 32.35 | 4.41 | 9.43 | 53.8 |
| Found | No. 1 | 32.2 | 4.6 | 9.2 | 53.5 |
|  | No. 2 | 32.4 | 4.5 | 9.3 | 53.3 |

Molar extinction coefficient was measured to be 23,600 in water at λ max of 260 nm. and NMR spectra confirmed the structure of the salt to be:

IV. 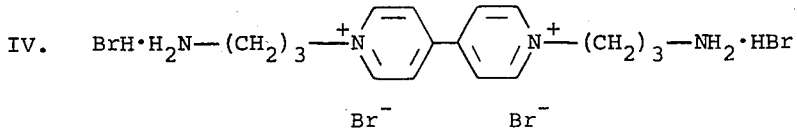

N,N'-bis-γ-aminopropyldipyridinium bromide hydrobromide Melting point was determined to be about 325° C. (with decomposition).

The hydrobromide procedure just described is not limited to the preparation of primary amines, and has been found to be equally applicable for secondary amines as well. To illustrate, 4,4'-bipyridyl was reacted with 3-bromopropyl (N-n-propyl)amine hydrobromide, which had been prepared in a known manner from the cleavage of 4-phenoxypropyl(N-n-propyl)amine with HBr (see JACS, 52, 287 (1930) and JACS, 58, 2277 (1936) ).

EXAMPLE II 0.78 g. (0.005 mole) of 4,4'-bipyridyl and 2.61 g. (0.010 mole) of 3-bromopropyl-(N-n-propyl)amine hydrobromide were dissolved in 25 ml. of ethanol at room temperature and the resultant solution was refluxed for a total of about 84 hours. A considerable amount of a pale yellow solid precipitated after cooling to room temperature. The solid was filtered, washed with a few milliliters of ethanol and dried in a vacuum dessicator at about 1 mm. pressure and at 25° to 45° C. for about 2 hours to yield about 1.72g. of product (about 50.7 percent yield). Upon dissolving in water, filtration to remove insoluble impurities, reprecipitation from ethanol, separation and drying, the pale shiny yellow solid gave the following two elemental analyses on the same sample in comparison with the calculated theoretical values:

|  |  | % of Element in Compound | | | |
|---|---|---|---|---|---|
|  |  | C | H | N | Br |
| Calculated |  | 38.9 | 5.64 | 8.25 | 47.1 |
| Found | No. 1 | 39.4 | 5.7 | 8.6 | 46.7 |
|  | No. 2 | 39.5 | 5.7 | 8.6 | 46.5 |

NMR spectra confirmed the product's structure to be:

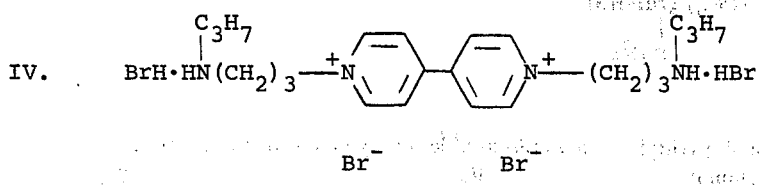

N,N'-bis[N''-(n -propyl)-γ-aminopropyl]dipyridinium bromide hydrobromide

Melting point was determined to be about 313°–314.5° C. (with decomposition) and the molar extinction coefficient in water was 23,600 at λ max of 260 nm.

The novel water-soluble viologen salts of formula II have proven to be extremely useful as monomers in interfacial polycondensation reactions, particularly those reactions which lead to novel film-forming polyviologens, as disclosed and claimed in copending U.S. application Ser. No. 395,255 filed on even date herewith and now U.S. Pat. No. 3,856,714 granted on Dec. 24, 1974.

Those skilled in the polymer art are familiar with interfacial polycondensation as an extremely versatile method for synthesizing polymers based on the classical "Schotten-Bauman" reaction for acylating amines. These polycondensation reactions normally proceed rapidly at low temperatures, e.g., room temperature, and take place at the interface between a solution of an acid dihalide in a water-immiscible organic solvent and an aqueous solution of a diamine monomer, e.g., a viologen salt of the present invention, to result in reasonably high molecular weight polymers.

For complete background on interfacial polymerization, its procedures and characteristics, reference may be had to *Journal of Polymer Science*, Vol. 40 (1959), particularly, pages 289–327.

Since the novel viologen salts of this invention undergo a reversible reduction to a radical-cation of different light absorption characteristics from the original dication upon the addition of one electron, as was previously described, they are also useful as redox compounds in variable light-filtering devices such as described in, for example, Rogers U.S. Pat. No. 3,652,149 issued Mar. 28, 1972; and Hall et al U.S. Pat. No. 3,692,388 issued Sept. 19, 1972. Reference is made to these patents for detailed procedures and examples involving the use of viologen compounds in such light-filtering devices.

As an illustration of this use, the aforementioned Rogers' patent describes a light-filtering device wherein a colorless, light-transmitting form of a redox compound, e.g., the oxidized form of a viologen salt of formula II, is dissolved in aqueous solution and positioned adjacent one of a pair of electrodes so that the colored form (i.e., the reduced, free radical form) of the compound may be produced in response to a flow of electric current, thereby rendering the device light absorbing. The original light-transmitting properties of the device are restored by reversing the current and oxidizing the redox compound back to its colorless form.

Formulae for viologen compounds set forth herein and in the appended claims represent the oxidized dicationic form of the viologen unit; however, it is to be understood that these viologen compounds may also be reduced as described above to take on a delocalized radical cation form.

It will also be apparent to those skilled in the chemical art that hydrohalide molecules, i.e., molecules represented by .$HX_1$ wherein $X_1$ is halide, are optionally associated with the amino groups of the viologen salts of this invention depending upon the environmental pH. For example, by rendering basic an aqueous solution of a viologen salt of the present invention with, for example, sodium carbonate during the above-described interfacial polycondensation reaction, a form of viologen salt is provided in which there are no hydrohalide molecules associated with the amino groups. On the other hand, viologen salt products prepared in accordance with the procedures detailed above contain a hydrohalide molecule associated with each of the two amino groups.

Since certain changes may be made in the above products and processes without departing from the scope of the invention herein involved, it is intended that the above description and examples shall be interpreted as illustrative and not in a limiting sense.

What is claimed is:
1. A water-soluble viologen salt of the formula:

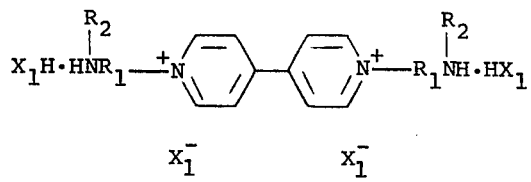

wherein $R_1$ is propylene or a straight-chain alkylene group having from 6 to 12 carbon atoms in the chain; $R_2$ is —H or a hydrocarbon group having from 1 to 6 carbon atoms; and $X_1$ is halide.

2. A water-soluble viologen salt of the formula:

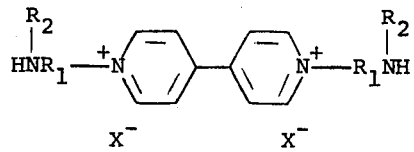

wherein $R_1$ is propylene or a straight-chain alkylene group having from 6 to 12 carbon atoms in the chain; $R_2$ is —H or an alkyl group having from 1 to 6 carbon atoms; and X is halide.

3. A compound as defined in claim 1 wherein $R_2$ is alkyl.

4. A salt as defined in claim 1 of the formula:

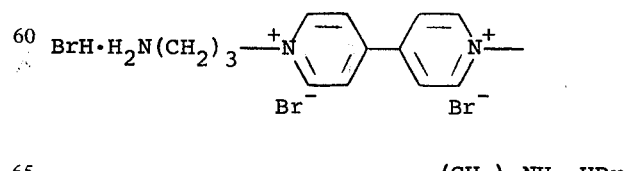

5. A salt as defined in claim 1 of the formula:

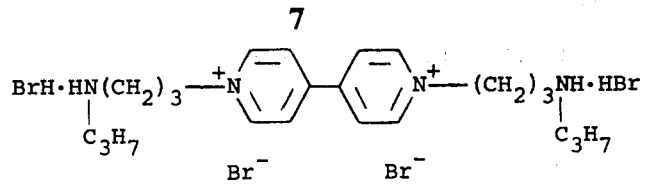

6. A process which comprises reacting 4,4'-bipyridyl with an amino halide hydrohalide of the formula:

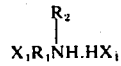

wherein $R_1$ is propylene or a straight-chain alkylene group having 6 to 12 carbon atoms in the chain; $R_2$ is —H or a hydrocarbon group having from 1 to 6 carbon atoms; and $X_1$ is halide; under reflux conditions to form a water-soluble viologen salt of the formula:

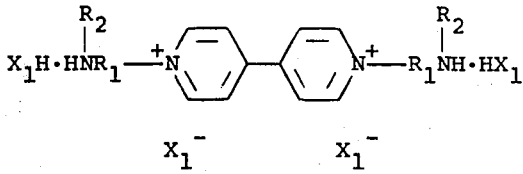

7. A process as defined in claim 6 wherein $X_1$ is bromide.

8. A process as defined in claim 5 wherein $R_2$ is alkyl.

* * * * *